United States Patent
Bork et al.

(10) Patent No.: US 7,990,269 B2
(45) Date of Patent: Aug. 2, 2011

(54) METHOD AND OPERATOR CONTROL UNIT FOR CONFIGURING AND MONITORING A DEVICE WITH FUNCTIONAL SAFETY

(75) Inventors: Harald Bork, Epfendorf (DE); Jochen Betz, Weil der Stadt (DE)

(73) Assignee: OMRON Corporation, Kyoto (JP)

( * ) Notice: Subject to any disclaimer, the term of this patent is extended or adjusted under 35 U.S.C. 154(b) by 449 days.

(21) Appl. No.: 12/091,891

(22) PCT Filed: Oct. 23, 2006

(86) PCT No.: PCT/EP2006/010179
§ 371 (c)(1), (2), (4) Date: Sep. 29, 2008

(87) PCT Pub. No.: WO2007/054201
PCT Pub. Date: May 18, 2007

(65) Prior Publication Data
US 2009/0303032 A1    Dec. 10, 2009

(30) Foreign Application Priority Data
Nov. 10, 2005   (EP) .................................. 05024525

(51) Int. Cl.
*G08B 13/18*   (2006.01)
(52) U.S. Cl. .................. 340/556; 340/555; 340/557
(58) Field of Classification Search .......... 340/555–557
See application file for complete search history.

(56) References Cited

U.S. PATENT DOCUMENTS

| | | | |
|---|---|---|---|
| 5,559,496 A * | 9/1996 | Dubats | 340/539.26 |
| 6,894,623 B2 * | 5/2005 | Hama et al. | 250/221 |
| 7,569,843 B2 * | 8/2009 | Lohmann | 250/559.4 |
| 2005/0052639 A1 | 3/2005 | Hartl | |
| 2005/0205763 A1* | 9/2005 | Beck et al. | 250/221 |

FOREIGN PATENT DOCUMENTS

| | | |
|---|---|---|
| DE | 29900149 | 1/1999 |
| DE | 10341007 | 4/2005 |
| EP | 0962787 | 12/1999 |

(Continued)

OTHER PUBLICATIONS

JP patent application No. 2008-539288, examination report dated Jul. 22, 2010, with English translation.

(Continued)

*Primary Examiner* — Jennifer Mehmood
*Assistant Examiner* — Mark Rushing
(74) *Attorney, Agent, or Firm* — Weaver Austin Villeneuve & Sampson LLP

(57) ABSTRACT

The present invention relates to a method for configuring a safety sensor such as a light barrier, with parameters which can be set on an application-specific basis, wherein an operator control unit equipped with input means is provided, which operator control unit is connected to the safety sensor under automatic interface and sensor identification, and the parameters on an application-specific basis are set using the input means, wherein a feedback message of the set parameters is simultaneously and automatically displayed in a visualized manner on a display unit (10) of the operator control unit. The present invention further relates to a corresponding operator control unit and to a method for monitoring a safety sensor with parameters which can be set on an application-specific basis.

20 Claims, 3 Drawing Sheets

FOREIGN PATENT DOCUMENTS

| | | |
|---|---|---|
| EP | 0964273 | 12/1999 |
| JP | 2002-296361 | 10/2002 |
| JP | 2005-106608 | 4/2005 |
| WO | 2007/075518 | 7/2007 |

OTHER PUBLICATIONS

EP patent application No. 06806456.7, SICK opposition (DE) Sep. 20, 2010.

EP patent application No. 06806456.7, SICK opposition (English) Sep. 20, 2010.

SICK opposition (DE), exhibit D1a, Rechung, Invoice of a delivery of CDs software and manual.

SICK opposition (DE), exhibit D1b, Stuckliste, Parts list with respect to the delivery according to a printout of the SICK database.

SICK opposition (DE), exhibit D1c, Benutzerhandbuch, SICK Configuration & Diagnostic Software CDS User Manual, Apr. 2003.

SICK opposition (DE), exhibit D1c, SICK User Manual Configuration & Diagnostic Software CDS User Manual, (English), Apr. 2003.

SICK opposition (DE), exhibit D1d, Betriebsanleitung, Sicherheits-Lichtvorhang, Operation instruction C 4000 Standard / Advanced, Apr. 2003.

SICK opposition (DE), exhibit D1d, SICK Sensor Intelligence Operating Instructions, C4000 Standard and C4000 Advanced Safety Light Curtain, (English) Oct. 2010.

SICK opposition (DE), exhibit D1e, Screenshots of CDS.

SICK opposition (DE), exhibit D1f, SICK AG Industrial Safety Systems Configuration & Diagnostic Software and Manuals booklet, Feb. 2003.

Bibliographic data for EP1946157, published Jul. 23, 2008.

EP patent application No. 06806456.7, Leuze opposition (DE) Sep. 14, 2010.

EP patent application No. 06806456.7, Leuze opposition (English) Sep. 14, 2010.

Leuze opposition (DE) exhibit D1, SafetyLab user Manual Diagnostic and Parameterization Software for COMPACTplus, Leuze lumiflex, Jan. 2005.

Leuze opposition (DE) exhibit D1, SafetyLab user Manual Diagnostic and Parameterization Software for COMPACTplus, Leuze lumiflex, Jan. 2005. (English).

Leuze opposition (DE) exhibit D2, Rechung, Invoice of Jul. 3, 2005 with respect to the delivery of the diagnostic and parametrization software SafetyLab of the company Leuze lumiflex to Milch Union Hocheifel eG, Pronsfeld.

JP patent application No. 2008-539288, Examination Report mailed Jul. 27, 2010.

* cited by examiner

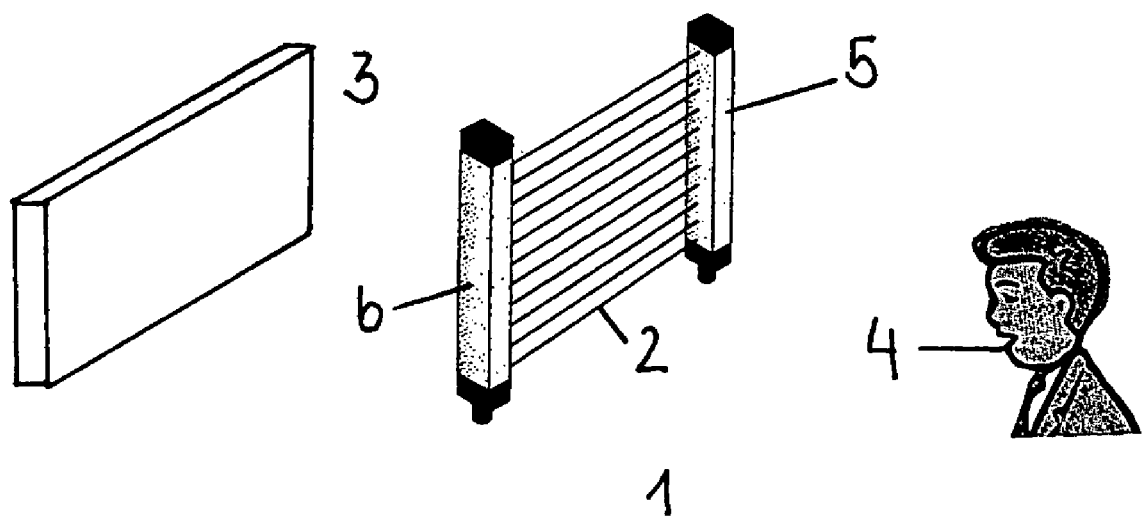
Figur 1

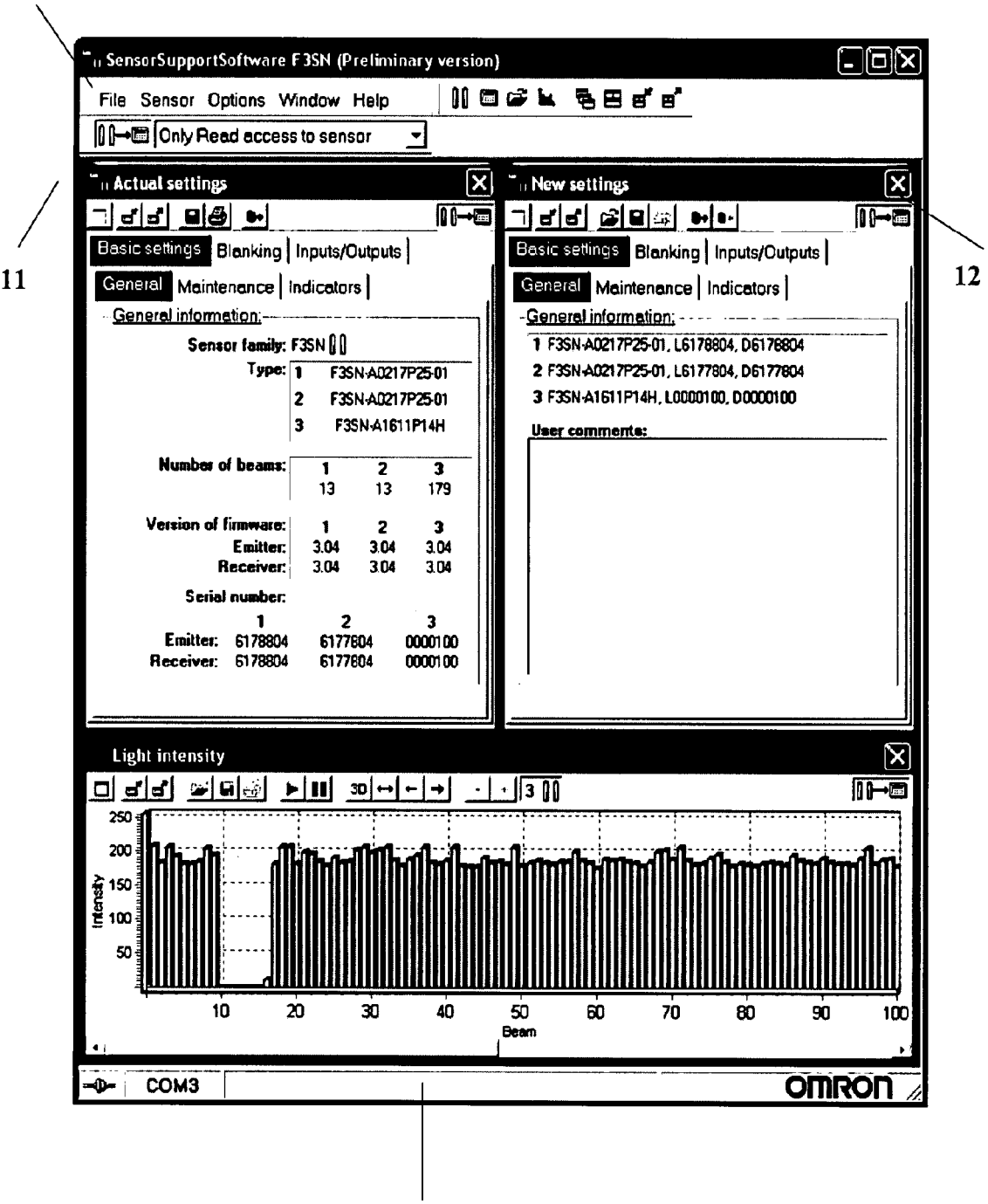
Figur 2

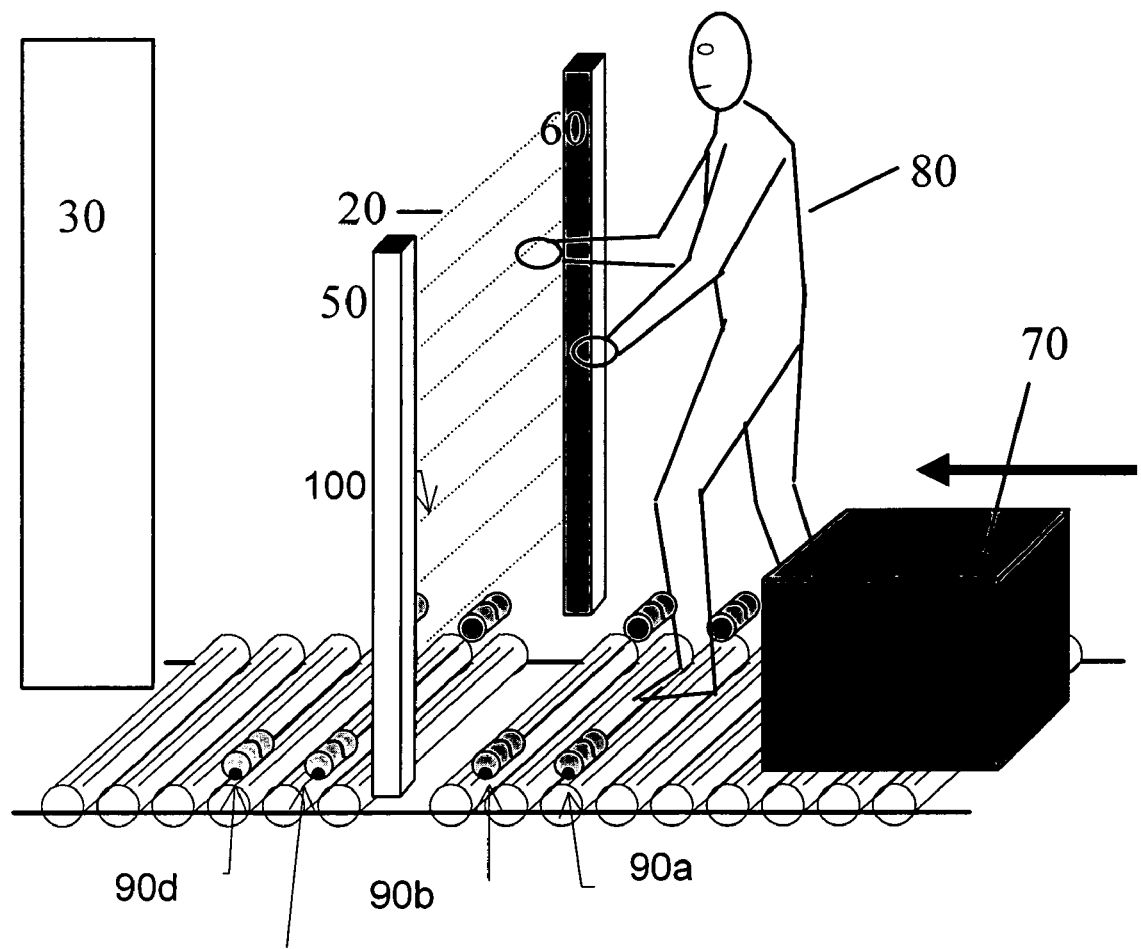
Figur 3

METHOD AND OPERATOR CONTROL UNIT FOR CONFIGURING AND MONITORING A DEVICE WITH FUNCTIONAL SAFETY

This application is a continuation of International Application No. PCT/EP2006/010179, filed Oct. 23, 2006 which claims priority on European Patent Application EP 05024525.7 filed Nov. 10, 2005.

FIELD OF THE INVENTION

The present invention relates to a method and an operator control unit for configuring, controlling and monitoring the correct functioning of a device with functional safety, in particular a safety sensor with parameters which can be set on an application-specific basis. In particular the present invention relates to a method for configuring a safety light barrier or a safety light grating with a plurality of light beams and for controlling and monitoring the correct installation and functioning of a safety sensor or safety light grating. In addition the invention relates to a computer program and a computer program product.

BACKGROUND OF THE INVENTION

Safety sensors and other products with functional safety according to EN 61508 have to be designed and comprehensively configured to meet the respective requirements of an application, the requirements on the part of a customer, as well as the relevant applicable norms and guidelines. For contactlessly operating protective devices for ensuring the safety of machines, such as for example safety light gratings or safety light barriers, the parameters to be set in the configuring procedure are very multifarious and complicated. In order to guarantee and ensure a correct configuration of the parameters to be set in a product used in connection with operational safety, a visible and recognizable acknowledgement or feedback of the set parameters is necessary so as to be able to avoid an incorrect configuration. A direct and immediate setting of the configuration on the safety-relevant device and also a setting of the configuration via a portable operating device is in this connection not very user-friendly, and in particular the acknowledgement and feedback for checking the setting is not assured. This type of configuration therefore conceals the danger of an incorrect parameterization. Also, there is no verification of the configuration data in the form of a printout or data record, which is desirable as regards the quality management aspect.

In the field of industrial automation a configuration method is known, in which here the configuration and parameterization is generally implemented via a project-related and object-oriented tree structure. In this case the components and modules are incorporated into the project hierarchy structure and processed similar to the case of an object-oriented programming. The configuration and setting of the individual components and modules has to be carried out by a skilled person who on the one hand is conversant with the nature of the configuration and on the other hand has the necessary knowledge to solve the safety-relevant application. In this type of configuration there is no user-guided control of the user by software employed for configuration purposes. The omission of individual configuration steps can lead to an incorrect functioning of the safety application. To employ such a method the user must have the necessary specialist knowledge in order to carry out a configuration. Furthermore, an operator control unit that is used to implement the method is not able when connected to a corresponding product, such as for example to a safety sensor, safety light grating or to similar safety-relevant devices, to display and implement an automatic sensor recognition. A user therefore has to carry out manually on the operator control unit each type of setting in relation to the product to be connected, after the components of the product have likewise been manually added to the corresponding software. Furthermore there is no direct visible acknowledgement of the implemented or altered configuration of the product, which means that a user is not able to control or check instantaneously after implementing the configuration, the effects thereby produced on the product, such as for example the safety sensor.

As already mentioned, the hitherto known methods are not user-friendly, and apart from this there is no direct acknowledgement or direct feedback of the actually executed settings and current functioning of the sensor. In particular, in this case it is not possible with safety light gratings to visualize the individual beams of the light grating so as to be able to control and appropriately alter and adjust their intensity. A direct feedback is not provided.

SUMMARY OF THE INVENTION

Against the background of the afore described prior art, the present invention now proposes a method for configuring a safety sensor, particularly a safety light grating with the features of claim 1, an operator control unit for configuring a safety sensor, particularly a safety light grating with the features according to claim 13, and a computer program with the features of claim 27 as well as a computer program product with the features of claim 28. Furthermore a method is provided for monitoring a safety sensor, particularly a safety light grating with the features of claim 12.

According to claim 1 a method is proposed for configuring a safety light grating with parameters which can be set on an application-specific basis, wherein an operator control unit equipped with input means is provided, which unit is connected under automatic interface and sensor recognition to the safety light grating, and the application-specific parameters are set by means of the input means, whereby an acknowledgement and a feedback of the set parameters is simultaneously and automatically visually displayed on a display unit of the operator control unit.

The method according to the invention accordingly provides an automatic interface recognition when the operator control unit and the safety sensor are coupled. The operator control unit can in this connection be a computer unit, such as for example a personal computer (PC), or a portable computer unit, such as for example a laptop. Furthermore it can in this case also be a commercially available PDA, a games consol with controller evaluation, an industrial control device with touch screen, as is available for example from the OMRON company, or a mobile phone with a programmable interface, such as is available commercially. Apart from wired connections via USB or RS485 or similar serial communications systems, other wireless communications connections are also conceivable, such as for example infrared communication (IrDA), radio communication (for example Bluetooth) or electromagnetic, inductive connections. The input means can be provided by a keyboard, but can also be implemented in the form of a so-called touch screen. On account of the automatic interface recognition a user does not have to establish manually and independently a data connection between the operator control unit and the safety sensor. Furthermore the method according to the invention ensures a sensor recognition, so that the operator control unit when connected to the corresponding sensor is automatically aware of the type of equipment or sensor that is connected, without the user himself having to input this information in any way, for example manually.

In this way it is possible for a software supporting the setting to make available only the configuration parameters and setting possibilities that are supported by the specific product connected in each case. Functions that are not made available by the corresponding product are automatically suppressed by the software, so that the user does not see these functions. This makes a significant contribution to the user-friendliness of the software and to reducing errors.

In one embodiment of the method according to the invention a safety light barrier or a safety light grating is used as safety sensor, with a plurality of light beams with a light intensity of a transmitter that can be set on an application-specific basis, with an amplification at a receiver which can be set on an application-specific basis and/or with a switching threshold of the respective receiver that can be set on an application-specific basis. If the safety sensor or the safety light grating is now connected to the operator control unit, then a user can recognize the light intensity of each individual light beam of the transmitter in real time on the display unit of the operator control unit. Likewise, a user can individually adjust the amplification of the signals at the receiver and the switching threshold at the receiver.

It is conceivable to visualize dynamically in real time the light intensity of each individual light beam of the light grating by means of a bar chart, wherein a bar of the bar chart reproduces and images precisely the light intensity of one of the light beams at the receiver A user is now able to erect and align the pair of light gratings in an optimal position. As soon as all beams show full intensity at the receiver, the light grating is optimally aligned and can be fixed in situ. The user can also via the input means of the operator control unit alter the settings of the light beams, for example as regards their respective light intensity, which is instantaneously visually displayed with the aid of the bar chart on the display unit of the operator control unit. Apart from the light intensity it is possible to choose as further parameters which can be set for example also a switching threshold for a switching at the receiver. By means of visualizing the parameters which can be set or altered, it is possible to configure in a rapid and simple manner the safety light barrier or the safety light grating in a specific application or in a specific installation. A compensation optimized as regards the respective use of the safety light grating can be effected in this way.

In a further embodiment of the method according to the invention it is furthermore envisaged to blank out in a targeted manner one or more light beams of the safety grating by means of the input means of the operator control unit. This may be relevant if for example a specific body of specific dimensions is to be intentionally moved unhindered through the safety light grating without switching off the apparatus, whose unhindered access through the safety light grating is to be prevented. The blanking out of the light beams of the safety light grating is effected in a targeted manner by means of the method according to the invention likewise via the input means of the operator control unit, and is, instantaneously automatically displayed in a visualized manner on the display unit of the operator control unit.

In a further conceivable embodiment of the method according to the invention the set parameters of the safety sensor are modified compared to their original setting, the modification being displayed instantaneously on the display unit of the operator control unit. In this way it is possible to carry out a controlled modification of the parameters to be set, which also enables a very slight or sensitive modification of the safety sensor or of the parameters of the safety sensor to be implemented.

In this case it is conceivable that the set parameters of the safety sensor can be modified only after authorization. Such an authorization can be realized and defined by a predetermined password. This means that a setting of the parameters is first of all secured by the password and the settings can be changed only by inputting the specific password. In this way a random alteration of adjusted parameters by an unauthorized user is prevented.

In a further possible embodiment of the method according to the invention the adjusted parameters are automatically stored at predeterminable times.

The predeterminable times can for example be input manually by a user. For example, with each change the previously adjusted parameters can automatically be saved.

Furthermore, it is however also conceivable that the adjusted parameters are stored periodically, in which connection also the periods can be input by the user by means of the input means. In this way quality management requirements can readily be met.

A further embodiment of the method according to the invention envisages that an error message is issued as soon as the safety sensor is decoupled from the operator control unit.

Furthermore it is possible for the operator control unit to be connected via a converter to the safety sensor. The. converter can in this connection be a USB-RS 485 converter, which is available for example from the Omron Electronics company. By means of such a converter data are transferred between the safety sensor and the operator control unit, for example a PC.

Moreover it is possible for a plurality of safety sensors to be configured simultaneously in parallel and independently of one another by means of the method according to the invention. In this case the adjusted parameters of each individual safety sensor can be stored, in order to be able to ensure a subsequent quality check and routability. Furthermore it is conceivable to use the stored parameters in order to carry out a systematic review of changes, so as thereby to be able to carry out for example troubleshooting and fault rectification.

Moreover the present invention includes an operator control unit for configuring at least one safety sensor, particularly one safety light grating with parameters which can be set on an application-specific basis, wherein the operator control unit includes connection means for connecting the operator control unit to the at least one safety sensor, detector means for the automatic interface and sensor recognition when the operator control unit is connected to the safety sensor, input means for setting and altering the application-specific parameters, and a display unit, wherein an acknowledgement or a feedback of the set or altered parameters can be simultaneously and automatically visually displayed on the display unit of the operator control unit after setting and/or altering the parameters.

It is possible to use the operator control unit for configuring a safety light barrier or a safety light grating with a plurality of light beams with a light intensity which can be set on an application-specific basis. Apart from the light intensity it is also conceivable to adjust at the receiver side an amplification and/or a switching threshold. The switching threshold is understood to denote the point at which the light beam can be regarded as "disrupted".

In one embodiment of the operator control unit the light intensity for each light beam of the safety light grating can be visually displayed dynamically in real time by a bar chart on the display unit of the said operator control unit, wherein a bar of the bar chart images precisely the light intensity of one of the light beams. The display unit can be a conventional screen, a display, or a LCD display.

In addition it is conceivable to blank out one or more light beams of the safety light grating in a targeted manner by means of the input means of the operator control unit. A defined selective blanking out of light beams of a safety light grating may be necessary for example if a specific object is to be allowed unhindered access to an apparatus screened by the safety light grating.

In another embodiment of the operator control unit the set parameters can be modified by means of the input means, which means that the modification can be displayed instantaneously on the display unit of the operator control unit. This means that each modification is effected in a controlled manner and the consequences of the implemented modification are immediately recognizable.

In a further embodiment of the operator control unit a modification of the set parameters of the safety sensor via the input means of the operator control unit can be carried out only after due authorization. In this case the authorization is defined and implemented by a predetermined password. This means that a user can alter the set parameters of the safety sensor only by inputting a specific password that is known to him. Any unauthorized influence on the set parameters of the safety sensor is thereby prevented.

Furthermore it is conceivable that the operator control unit according to the invention includes a memory, by means of which the set parameters can automatically be stored at predeterminable times and kept so that they can be retrieved. In this case it is conceivable periodically to store the set parameters in the memory and to predetermine the periods by means of the input means. Other times can however also be predetermined, for example if a modification is to be carried out.

In this case it is conceivable that the memory keeps as it were a history of the set parameters, whereby the implemented modifications of the parameters can be traced back. Such a stored history can be helpful in subsequent quality control or troubleshooting in the case of an error or fault that has occurred.

The memory can also be used to store a password and other access data. In this way access to configuration data and other safety-relevant and confidential information can be controlled and regulated.

In another embodiment of the operator control unit provided according to the invention, the operator control unit additionally includes a detector unit, via which an error message can be issued as soon as the safety sensor is decoupled from the operator control unit. In this way it is immediately apparent that the safety sensor is no longer under control, and an immediate response to the situation can be made.

In a further embodiment of the operator control unit according to the invention the operator control unit is suitable for displaying on the display unit a type of framework, i.e. a user surface with different windows, in which a specific function and task is allocated to each window. In this case at least a first, a second and a third window can be displayed. The first window can for example display the current (actual) status of the parameters of the safety sensor and can be used for monitoring (read only). The second window shows for example a status of the parameters of the safety sensor that can be set and input via the input means. The third window visualizes the light beams of the safety sensor or of the light grating in real time. The actual light beam status is thereby illustrated. This function is particularly helpful for monitoring, and when installing of the light grating. Errors in the installation procedure can thereby be avoided.

In this case it is conceivable that the first window is exclusively readable and the second window is readable and is accessible by means of the input means, in particular authorized specific inputs. This means that the inputs in the second window which can be made via the input means are automatically shown in the first window of the framework on transfer to the sensor. Such an activation of inputs recognizable in the second sensor can be effected for example in the case where the input means corresponds to a keyboard, by pressing one or more keys. The input means can however also be in the form of a so-called touch screen, which means that inputs can be made and for example also activated by touching corresponding points on the second window.

The present invention moreover relates to a method for monitoring a safety sensor, particularly a safety light grating with parameters which can be set on an application-specific basis, wherein an operator control unit equipped with input means is provided, which is connected under automatic interface and sensor recognition to the safety sensor, wherein an acknowledgement of set parameters and light intensities at a receiver is simultaneously and automatically displayed visually on a display unit of the operator control unit.

The operator control unit according to the invention can also be installed so as to be able to carry out a method according to the invention for monitoring as well as a method according to the invention for configuring a safety sensor.

In addition to this the present invention includes a computer program with program code means so as to carry out all steps of a method according to the invention when the computer program is run on a computer or a corresponding computer unit, in particular an operator control unit according to the invention. This can be realized for example in the form of an operator terminal with touch screen, as is available in automation technology and is also marketed by the OMRON company.

The present invention also relates to a computer program product with program code means which are stored on a computer-readable data carrier, so as to carry out all steps of a method according to the invention when the computer program is run on a computer or a corresponding computer unit, in particular an operator control unit according to the invention.

The advantages of the present invention can be seen in particular in the fact that on the one hand an automatic interface recognition is provided when the operator control unit is connected to the safety sensor. Furthermore an automatic sensor recognition is ensured. Accordingly a user does not have to be actively involved in order to manually effect a data communication between the operator control unit and the safety sensor. A further advantage can be seen in the fact that, for example in the case of a safety light grating in a possible embodiment of the method according to the invention or the operator control unit according to the invention, the light intensity of the light beams can be visualized in real time for each individual light beam and can be displayed for example in the form of a bar chart, so that a clear assessment can be made as to whether the safety light grating is correctly aligned. In the case of an incorrect alignment of the light grating not all beams are correctly incident on a respective receiver. The full amplitude of the bars is therefore not displayed and the user can immediately recognize in which region of the light grating the alignment of the light grating has to be optimized. A particular user-friendliness can also be recognized in the possible configuration of the framework provided in an embodiment of the operator control unit according to the invention, in the form of three separate windows each with its special functionalities. The structure of the three different windows gives the user an overview of what is given, since the first window shows the set actual parameters, what can be set, which is implemented and displayed in the second window, and which effect an implemented setting actually has, which is shown by the third window. A further advantage can be seen in a write protection or input protection envisaged in a possible embodiment and realized for example by a password, whereby the parameters can be set or altered only by authorization, which means that an unauthorized access or a mis-configuration or modification of the settings can be avoided. Also, the possible direct visualization and error notification in the event that the communication between the safety sensor and operator control unit is interrupted, makes the method according to the invention user-friendly. A possible USB-based connection of the safety sensor to the operator control unit ensures a coupling to any type of PC or laptop. Furthermore, according to an embodiment of the method according to the invention and by means of an embodiment of the operator control unit according to the invention, a plurality of different safety sensors can be configured in parallel and independently of one another. The possible storage of set parameters for the purposes of safety and quality compensation, tracing and error detection is also an advantage of the present invention.

Further advantages and modifications of the invention follow from the following description and accompanying drawings.

It is understood that the features mentioned hereinbefore and still to be discussed hereinafter can be employed not only in the respective stated combination, but also in other combinations or in isolation, without going beyond the scope of the present invention.

BRIEF DESCRIPTION OF THE DRAWINGS

The invention is diagrammatically illustrated in the drawings with the aid of examples of implementation and is described in detail hereinafter with reference to the drawings, in which:

FIG. 1 shows an example of a safety sensor, which can be configured by means of an embodiment of the method according to the invention;

FIG. 2 shows a section of a visualized representation of a display unit of an embodiment of the operator control unit according to the invention; and FIG. 3 shows another example of a safety sensor with a so-called "muting" function, as can be configured by another embodiment of the operator control unit according to the invention.

DETAILED DESCRIPTION OF THE DRAWINGS

FIG. 1 shows a safety sensor 1, which in this case corresponds to a safety light barrier or a safety light grating with a plurality of parallel light beams 2. The safety light barrier 1 is intended to screen an apparatus 3 against unauthorized and uncontrolled access. Access by a user 4 to the apparatus 3 from the safety light barrier 1 side is prevented by means of the safety light barrier 1. The light beams 2 in this case run parallel to one another between two oppositely facing vertically aligned columns 5 and 6, wherein the column 5 for example includes the respective light beam sources, while the column 6 contains the corresponding light beam sinks. Depending on the particular application the light intensity of the individual light beams at the receiver as well as also for example special functions such as "muting", "blanking", "restart interlock", "partial blanking", "moving partial blanking", etc., have to be precisely set and configured. This configuring of the light beams is now carried out by means of an operator control unit according to the invention, which is not shown here. In the arrangement illustrated here it is also possible that individual light beams 2 are intentionally blanked out for an authorized access of for example a specific product that has to reach the apparatus 3 during operation of the latter. Also, this targeted blanking can be specifically set by means of the operator control unit.

FIG. 2 now shows a section of a display unit 10 of an operator control unit according to the invention, which is connected to a safety sensor, such as for example to a safety light grating, as illustrated in FIG. 1. A type of framework is shown on the display unit 10, with a first window 11, a second window 12 and a third window 13. The first window 11 shows the current status or current settings ("actual settings") of parameters characterizing the safety light grating, such as for example the light intensity of the light beams of the safety light grating. The second window 12 shows a status of the parameters of the safety sensor that can be set and input via the input means ("new settings"). The third window 13 shows in visual form the set parameters, such as for example the light intensity of the individual light beams. The window 11 shows for example a basic setting of the safety light grating. The window 12 shows the settings that can be set and changed via the input means of the operator control unit. The window 13 shows in this case for example in the form of a bar chart the light intensity of the individual light beams of the safety light grating. As soon as a change in the current (actual) settings is made, this is simultaneously shown in the corresponding diagram in the window 13. In this way it is possible to have an immediate control over changes that are implemented, whereby a very precise and controlled configuration of the safety light grating can be implemented.

FIG. 3 shows a safety sensor 100, which in this case corresponds to a safety light barrier or a safety light grating with a plurality of parallel light beams 20. The safety light barrier 100 is in this connection again intended to screen an apparatus 30 against unauthorized or uncontrolled access. By means of the safety light barrier 100, access by a user 80 to the apparatus 30 from the safety light barrier side 100 is prevented. The light beams 20 in this case run parallel between two oppositely facing and vertically aligned columns 50 and 60, wherein the column 50 includes for example the respective light beam sources, while the column 60 contains the corresponding respective light beam sinks. In the arrangement illustrated here a so-called "muting" functionality is shown, the configuration of which can be performed by means of an operator control unit according to the invention (not shown here). Such a functionality envisages that specific pre-defined light beams can be blanked out in a targeted manner for specific objects 70, so that these objects 70 can be brought unhindered up to the apparatus 30, while at the same time these light beams are not blanked out for other objects, in particular for persons 80, thereby reliably preventing a person 80 having access to the apparatus 30. In order to realize such a functionality, two pairs of muting sensors 90 spaced apart from one another at a defined distance are provided respectively in front of and behind the safety sensor 100. The sensors of one pair are in each case arranged facing opposite one another at a distance appropriate to the passage of an object. The interspacing of the sensors of a pair can in this case correspond to the interspacing of the two vertically aligned, oppositely facing columns 50 and 60 of the safety sensor 100. The sensors are in this case adjusted so that, when an object 70 that is to have access to the apparatus 30 approaches the safety sensor 100, some beams are specifically blanked out, so that the object 70 can pass. When the object 70 passes or reaches at a time t1 the first pair of sensors 90a and at a time t2 the second pair of sensors 90b, then the pairs of sensors 90a and 90b can be set via the resultant time difference t1-t2 so that they initiate a blanking of predefined light beams of the safety sensor 100. The pair of sensors 90c and 90d, which are arranged on the side of the safety sensor 100 facing towards the apparatus 30, correspondingly effect a restoration of the previously blanked out light beams when the object 70 passes the pair of sensors 90c and 90d. Since a person 80 approaches the safety sensor 100 at a different velocity and accordingly does not pass the pair of sensors 90a and 90b successively in an adjustable time difference t1-t2, then if the pair of sensors 90a and 90b are suitably configured the light beams are not blanked out, with the result that the safety sensor 100 furthermore performs its safety function as regards a person 80 and prevents the latter having unhindered access. Since the sensors 90 have to be adjusted very precisely and accurately, their configuration was hitherto extremely onerous. With the aid of an operator control unit according to the invention a configuration of such sensors can now be carried out very quickly, simply and in particular in real time via the display unit provided by the operator control unit. In addition separate functions and setting possibilities can be shown on the display unit, with the aid of which a user can make the appropriate settings.

The invention claimed is:

1. Method for configuring a safety sensor (1, 100) with parameters which can be set on an application-specific basis, said method comprising the steps of:
    providing an operator control unit equipped with a display device and input means for setting application-specific parameters;
    connecting said operator control unit to said safety sensor under automatic interface and sensor recognition;
    using said operator control unit to automatically recognize the kinds of interface connected to said safety sensor and said connected safety sensor;
    displaying on said display device an image including a first window, a second window and a third window, said first window showing current status of the parameters supported by the safety sensors of the recognized kinds, said second window showing settings that can be set through said input means, and said third window visualizing dynamically in real time light intensity of individual light beam; and
    transmitting a newly set parameter value, when said newly set parameter value is inputted to said second window, to said safety sensor and using said newly set parameter value to update the display in said first window and the visualization in said third window.

2. Method according to claim 1, wherein a safety light barrier or a safety light grating is used as safety sensor (1, 100), with a plurality of light beams with a light intensity of a transmitter (5, 50) which can be set on an application-specific basis, with an amplification at a receiver (6, 60) which can be set on an application-specific basis, and/or with a switching threshold at the receiver (6, 60) which can be set on an application-specific basis.

3. Method according to claim 2, wherein the light intensity for each light beam of the safety grating is dynamically visually displayed in real time by means of a bar chart, wherein a bar of the bar chart images precisely the light intensity of a light beam.

4. Method according to claim 1 further comprising the step of blanking out one or more light beams of said safety sensor by means of said input means in a targeted manner.

5. Method according to claim 4, wherein the set parameters are modified and the modification is instantaneously visually displayed on the display unit (10) of the operator control unit.

6. Method according to claim 5, wherein the set parameters are modified only after authorisation.

7. Method according to claim 6, wherein the authorisation is defined and realised by means of a predetermined password.

8. Method for monitoring a safety sensor (1, 100) with parameters which can be set on an application-specific basis, said method comprising the steps of:
    providing an operator control unit equipped with a display device and input means for setting application-specific parameters;
    connecting said operator control unit to said safety sensor under automatic interface and sensor recognition;
    using said operator control unit to automatically recognize the kinds of interface connected to said safety sensor and said connected safety sensor;
    displaying visually on said display device simultaneously and automatically an acknowledgment of the set parameters and light intensities at a receiver,
    displaying on said display device an image including a first window, a second window and a third window, said first window showing current status of the parameters supported by the safety sensors of the recognized kinds, said second window showing settings that can be set through said input means, and said third window visualizing dynamically in real time light intensity of individual light beam; and
    transmitting a newly set parameter value, when said newly set parameter value is inputted to said second window, to said safety sensor and using said newly set parameter value to update the display in said first window and the visualization in said third window.

9. Operator control unit for configuring at least one safety sensor (1, 100) with parameters which can be set on an application-specific basis, wherein the operator control unit includes
    connection means for connecting the operator control unit to the at least one safety sensor (1, 100),
    detector means for the automatic interface and sensor recognition when the operator control unit is connected to the safety sensor, input means for setting and altering the application-specific parameters,
    a display unit (10), and
    a control unit for displaying on said display unit a first window, a second window and a third window, said first window showing current status of the parameters supported by the safety sensors of the recognized kinds, said second window showing settings that can be set through said input means, and said third window visualizing dynamically in real time light intensity of individual light beam, an acknowledgement of the set or altered parameters being simultaneously and automatically visually displayed on the display unit (10) of the operator control unit.

10. Operator control unit according to claim 9, wherein the operator control unit can be used for configuring a safety light barrier or a safety light grating with a plurality of light beams with a light intensity which can be set on an application-specific basis.

11. Operator control unit according to claim 10, wherein the light intensity for each light beam of the safety grating can be dynamically visually displayed in real time on the display unit (10) by means of a bar chart, wherein a bar of the bar chart images precisely the light intensity of a light beam.

12. Operator control unit according to claim 10, wherein one or more light beams of the safety sensor can be blanked out in a targeted manner by means of the input means of the operator control unit.

13. Operator control unit according to claim 12, wherein the set parameters can be modified by means of the input means and the modification can be instantaneously visually displayed on the display unit (10) of the operator control unit.

14. Operator control unit according to claim 13, wherein a modification of the set parameters via the input means can take place only after authorisation.

15. Operator control unit according to claim 14, wherein the authorisation is defined and realised by means of a predetermined password.

16. Method according to claim 3, wherein one or more light beams of the safety grating are blanked out in a targeted manner by means of the input means of the operator control unit.

17. Method according to claim 6, wherein the set parameters are modified and the modification is instantaneously visually displayed on the display unit (10) of the operator control unit.

18. Method according to claim 17, wherein the set parameters are modified only after authorisation.

19. Operator control unit according to claim 11, wherein one or more light beams of the safety grating can be blanked out in a targeted manner by means of the input means of the operator control unit.

20. Operator control unit according to claim 19, wherein the set parameters can be modified by means of the input means and the modification can be instantaneously visually displayed on the display unit (10) of the operator control unit.

* * * * *